United States Patent
Bhaya et al.

(10) Patent No.: US 11,514,907 B2
(45) Date of Patent: *Nov. 29, 2022

(54) ACTIVATION OF REMOTE DEVICES IN A NETWORKED SYSTEM

(71) Applicant: Google LLC, Mountain View, CA (US)

(72) Inventors: Gaurav Bhaya, Sunnyvale, CA (US);
Ulas Kirazci, Mountain View, CA (US); Bradley Abrams, Palo Alto, CA (US); Adam Coimbra, Mountain View, CA (US); Ilya Firman, Sunnyvale, CA (US); Carey Radebaugh, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/860,679

(22) Filed: Apr. 28, 2020

(65) Prior Publication Data

US 2020/0258523 A1    Aug. 13, 2020

Related U.S. Application Data

(63) Continuation of application No. 16/107,617, filed on Aug. 21, 2018, now Pat. No. 11,011,164, which is a
(Continued)

(51) Int. Cl.
*G10L 15/22*      (2006.01)
*G10L 15/18*      (2013.01)
(Continued)

(52) U.S. Cl.
CPC ............ *G10L 15/22* (2013.01); *G06F 40/216* (2020.01); *G10L 15/1815* (2013.01);
(Continued)

(58) Field of Classification Search
CPC .... G10L 15/22–2015/228; G10L 15/30; G10L 15/18–15/187; G06F 40/20–40/295; G06F 40/40
See application file for complete search history.

(56) References Cited

U.S. PATENT DOCUMENTS 7,596,568 B1 *   9/2009   McConnell ......... G06F 16/3338
9,323,722 B1      4/2016   Kol
(Continued)

OTHER PUBLICATIONS

"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
(Continued)

*Primary Examiner* — Abul K Azad
(74) *Attorney, Agent, or Firm* — Dority & Manning, P.A.

(57) ABSTRACT

The present disclosure is generally directed to the generation of voice-activated data flows in interconnected network. The voice-activated data flows can include input audio signals that include a request and are detected at a client device. The client device can transmit the input audio signal to a data processing system, where the input audio signal can be parsed and passed to the data processing system of a service provider to fulfill the request in the input audio signal. The present solution is configured to conserve network resources by reducing the number of network transmissions needed to fulfill a request.

20 Claims, 6 Drawing Sheets

Related U.S. Application Data continuation of application No. 16/064,961, filed as application No. PCT/US2018/031451 on May 7, 2018, now Pat. No. 11,145,300.

(51) Int. Cl.
| | |
|---|---|
| *G10L 15/30* | (2013.01) |
| *G06F 40/216* | (2020.01) |
| *G06F 40/30* | (2020.01) |
| *G06F 16/901* | (2019.01) |
| *G06F 40/35* | (2020.01) |

(52) U.S. Cl.
CPC .......... *G10L 15/1822* (2013.01); *G10L 15/30* (2013.01); *G06F 16/9024* (2019.01); *G06F 16/9027* (2019.01); *G06F 40/30* (2020.01); *G06F 40/35* (2020.01); *G10L 2015/223* (2013.01); *G10L 2015/225* (2013.01)

(56) References Cited

U.S. PATENT DOCUMENTS

| | | | |
|---|---|---|---|
| 9,369,544 | B1 | 6/2016 | Morgan et al. |
| 10,431,209 | B2 | 10/2019 | Bhaya et al. |
| 10,565,985 | B1 | 2/2020 | Huang et al. |
| 11,011,164 | B2* | 5/2021 | Bhaya ................... G06F 9/4843 |
| 11,145,300 | B2* | 10/2021 | Bhaya ................. G10L 15/1822 |
| 2014/0310283 | A1 | 10/2014 | Laligand et al. |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0228367 | A1* | 8/2017 | Pasupalak ......... G06F 16/90332 |
| 2017/0235824 | A1 | 8/2017 | Liu |
| 2017/0257456 | A1 | 9/2017 | Vaish et al. |
| 2017/0358301 | A1 | 12/2017 | Raitio et al. |
| 2019/0102378 | A1* | 4/2019 | Piernot ................. G06F 40/295 |

OTHER PUBLICATIONS

"'Dolphin' attacks fool Amazon, Google voice assistants", BBC News, Sep. 7, 2017 (8 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Crist, Ry, "Logitech Harmony's Alexa skill just got a whole lot better", CNET, Jul. 13, 2017 (2 pages).
Estes, Adam Clark, "Amazon's Newest Gadget Is a Tablet That's Also an Echo", Gizmodo, Sep. 19, 2017 (3 pages).
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Google Developers, "GoogleAssistant SDK", retrieved Aug. 22, 2017 from URL: https://developers.google.com/assistant/sdk/ (4 pages).
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Search Report and Written Opinion for PCT Appln. Ser. No. PCT/US2018/031451 dated Jan. 29, 2019 (12 pages).
Johnston, Lisa, "Amazon Whirlwind: New Echo, Plus, Spot, Connect, Fire TV Take the Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (2 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC News, May 18, 2017 (9 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 16/107,617 dated Mar. 17, 2020 (8 pages).
Novet, et al., "Amazon is getting ready to bring Alexa to work", CNBC, Nov. 29, 2017 (4 pages).
Palladino, Valentina, "Garmin teamed up with Amazon to make a tiny Echo Dot for your car", ars Technica, Oct. 17, 2017 (2 pages).

(56) References Cited

OTHER PUBLICATIONS

Perez, Sarah, "Alexa's 'Routines' will combine smart home control with other actions, like delivering your news and weather", TechCrunch, Sep. 28, 2017 (10 pages).

Perez, Sarah, "The first ad network for Alexa Skills shuts down following Amazon's policy changes", Tech Crunch, Jun. 15, 2017 (6 pages).

Porter, Jon, "Amazon Echo Show release date, price, news and features", Techradar, Jun. 26, 2017 (14 pages).

Pringle, Ramona, "'I'm sorry to hear that': Why training Siri to be a therapist won't be easy", CBC News, Sep. 24, 2017 (3 pages).

Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).

Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).

Purcher, Jack, "Today Google Home's Virtual Assistant can learn its Owner's voice for Security Reasons like Apple's Patent Pending Idea", Patently Apple, Apr. 20, 2017 (4 pages).

Sablich, Justin, "Planning a Trip With the Help of Google Home", New York Times, May 31, 2017 (6 pages).

Seifert, Dan, "Samsung's new virtual assistant will make using your phone easier", The Verge, Mar. 20, 2017 (6 pages).

Sherr, Ian, "IBM built a voice assistant for cybersecurity", CNET, Feb. 13, 2017 (9 pages).

Siegal, Daniel, "IP Attys Load up Apps' Legal Challenges at 'Silicon Beach'", Law360, Los Angeles, California, Feb. 2, 2017 (4 pages).

Willens, Max, "For publishers, Amazon Alexa holds promise but not much money (yet)", Digiday, Jul. 6, 2017 (6 pages).

* cited by examiner

ACTIVATION OF REMOTE DEVICES IN A NETWORKED SYSTEM

CROSS-REFERENCE TO RELATED APPLICATIONS

This application claims the benefit of priority under 35 U.S.C. § 120 as a continuation of U.S. patent application Ser. No. 16/107,617, filed Aug. 21, 2018, which claims the benefit of priority under 35 U.S.C. § 120 as a continuation of U.S. patent application Ser. No. 16/064,961 filed Jun. 21, 2018, which is a U.S. National Stage under 35 U.C.S. § 371 of International Patent Application No. PCT/US2018/031451, filed on May 7, 2018 and designating the United States. The foregoing applications are hereby incorporated by reference in their entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The excessive network transmissions can occur when multiple network transmissions are used to clarify or request additional information in response to a first network transmission.

SUMMARY

According to at least one aspect of the disclosure, a system to generate voice-activated threads in a networked computer environment can include a data processing system. The data processing system can include one or more processors and memory. The data processing system can execute a natural language processor ("NLP"), a remote application launcher, and an action handler component. The data processing system can receive, by the NLP component, a first input audio signal detected by a sensor of a first client computing device. The data processing system can parse, by the NLP component, the first input audio signal to identify a first request and a first entity. The data processing system can determine, by the action handler component, a plurality of candidate service provider devices. Each of the plurality of candidate service provider devices can be configured to fulfill the first request. Each of the plurality of candidate service provider device can be associated with a respective application installed on the first client computing device. The data processing system can select, by the action handler component, a service provider device from the plurality of candidate service provider devices. The data processing system can generate, by the remote application launcher, a digital component. The digital component can include an indication of the application associated with the service provider device and the first entity. The digital component can be configured to launch the application associated with the service provider device when executed by the first client computing device to fulfill the first request. The data processing system can transmit, by the action handler component, the digital component to the first client computing device in response to the first input audio signal.

According to at least one aspect of the disclosure, a method to generate voice-activated threads in a networked computer environment can include receiving, by an NLP component executed by a data processing system, a first input audio signal detected by a sensor of a first client computing device. The method can include parsing, by the NLP component, the first input audio signal to identify a first request and a first entity. The method can include determining, by an action handler component executed by the data processing system, a plurality of candidate service provider devices. Each of the plurality of candidate service provider devices can be configured to fulfill the first request. Each of the plurality of candidate service provider device can be associated with a respective application installed on the first client computing device. The method can include selecting, by the action handler component, a service provider device from the plurality of candidate service provider devices. The method can include generating, by a remote application launcher executed by the data processing system, a digital component. The digital component can include an indication of the application associated with the service provider device and the first entity. The digital component can be configured to launch the application associated with the service provider device when executed by the first client computing device to fulfill the first request. The method can include transmitting, by the action handler component, the digital component to the first client computing device in response to the first input audio signal.

According to at least one aspect of the disclosure, a system to generate voice-activated threads in a networked computer environment can include a data processing system. The data processing system can execute an NLP component and an action handler component. The data processing system can receive a first input audio signal that is detected by a sensor of a first client computing device. The data processing system can parse the first input audio signal to identify a first request. The data processing system can select a first action data structure based on the first request. The first action data structure can be associated with a first service provider device. The data processing system can transmit a first audio-based input request to the first client based at least on a field in the first action data structure. The data processing system can receive a second input audio signal detected by the sensor of the first client computing device that is generated in response to the first audio-based input request. The data processing system can parse the second input audio signal to identify a response entity in the second input audio signal. The data processing system can expand the response entity based on an expansion policy that is associated with the first client computing device. Expanding the response entity can include converting the response entity into format associated with the field in the first action data structure. The data processing system can populate the expanded response entity into the field of the first action data structure. The data processing system can transmit the first action data structure to the first service provide to fulfill the first request.

According to at least one aspect of the disclosure, a method to generate voice-activated threads in a networked computer environment can include receiving a first input audio signal that is detected by a sensor of a first client computing device. The method can include parsing the first input audio signal to identify a first request. The method can include selecting a first action data structure based on the first request. The first action data structure can be associated with a first service provider device. The method can include transmitting a first audio-based input request to the first client based at least on a field in the first action data structure. The method can include receiving a second input audio signal detected by the sensor of the first client computing device that is generated in response to the first audio-based input request. The method can include parsing the second input audio signal to identify a response entity in the second input audio signal. The method can include expanding the response entity based on an expansion policy that is associated with the first client computing device. Expanding the response entity can include converting the response entity into format associated with the field in the first action data structure. The method can include populating the expanded response entity into the field of the first action data structure. The method can include transmitting the first action data structure to the first service provide to fulfill the first request.

Each aspect can optionally include one or more of the following features. Parsing, by the natural language processor component, the first input audio signal to identify a second entity; expanding, by the action handler component executed by the data processing system, the second entity based on an expansion policy associated with the first client computing device and into a format associated with a field of the digital component; generating, by the action handler component, the digital component to include the expanded second entity in the field of the digital component. Parsing, by the natural language processor component, the first input audio signal to identify a second entity; and determining, by the action handler component, the second entity cannot be expanded based on an expansion policy associated with the first client computing device. Transmitting, by the action handler component, an audio-based input request to the first client computing device to request an updated entity. The digital component may be configured to populate a field of the application associated with the service provider device with the first entity when executed by the first client computing device. Measuring, by the action handler component, a network latency between the data processing system and each of the plurality of candidate service provider devices; and selecting, by the action handler component, the service provider device from the plurality of candidate service provider devices based at least on the network latency between the data processing system and each of the plurality of candidate service provider devices. Selecting, by the action handler component, the service provider device from the plurality of candidate service provider devices based at least a performance of each of the plurality of candidate service provider devices. Selecting, by the action handler component, the service provider device from the plurality of candidate service provider devices based at least a preference associated with the first client computing device. Receiving, by the natural language processor component, a second input audio signal detected by the sensor of the first client computing device, the second input audio signal comprising an indication of the service provider device; and selecting, by the action handler component, the service provider device from the plurality of candidate service provider devices based at least on the indication of the service provider device. Receiving, by the natural language processor component, a second input audio signal detected by the sensor of the first client computing device; parsing, by the natural language processor component, the second input audio signal to identify a second request and a second entity; determining, by the action handler component, the service provider device is configured to fulfill the second request; generating, by the action handler component, a first action data structure based on the second request and comprising the second entity; and transmitting, by the action handler component, the first action data structure to the service provider device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
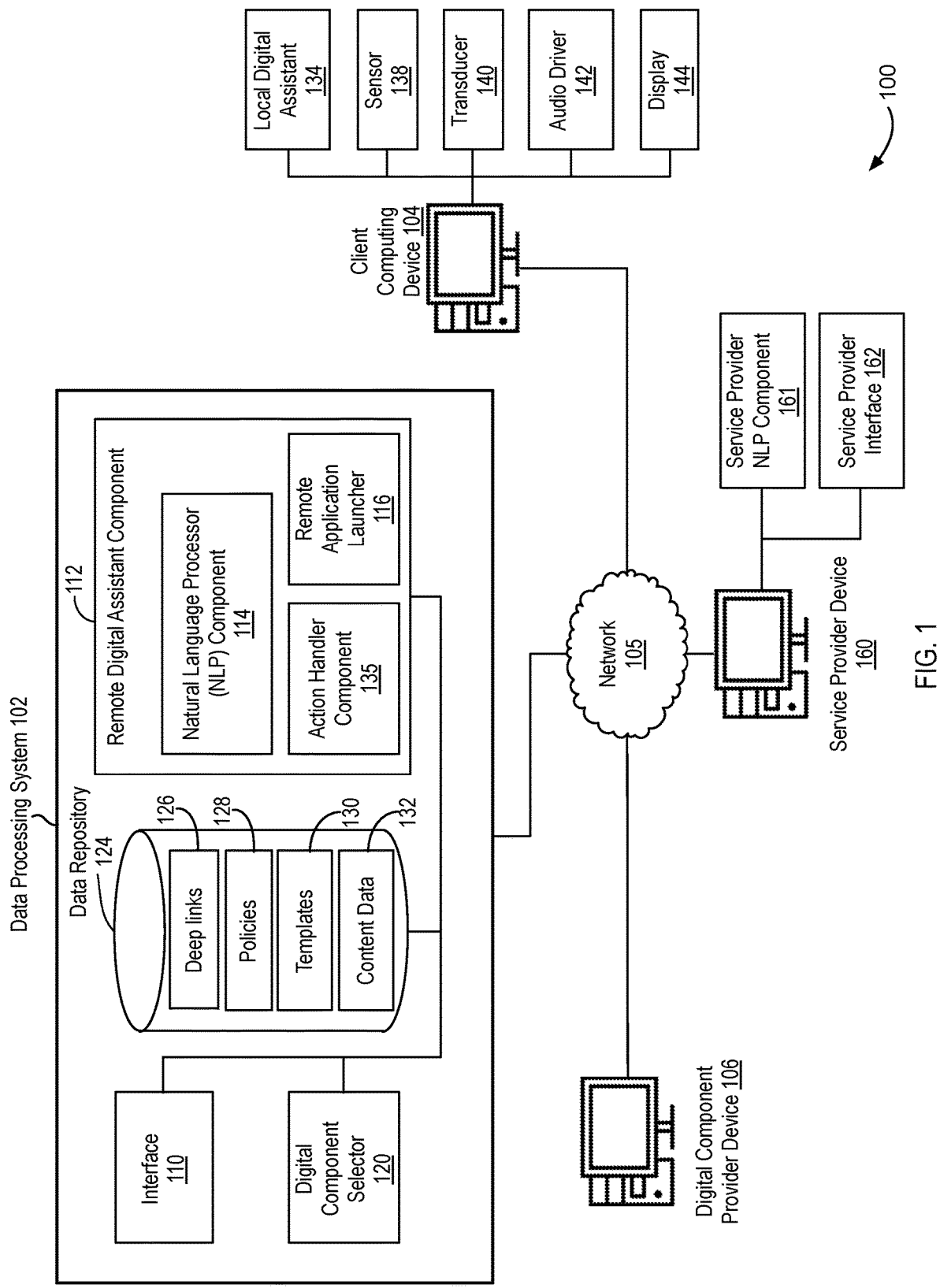
FIG. 1 illustrates block diagram of an example system to authenticate computing devices, in accordance with an example of the present disclosure.

Following below are more detailed descriptions of various concepts related to, and implementations of, methods, apparatuses, and systems to generate voice-activated data flows in interconnected network. The various concepts introduced above and discussed in greater detail below may be implemented in any of numerous ways.

The present disclosure is generally directed to the generation of voice-activated data flows in interconnected networks. The voice-activated data flows can include input audio signals that include a request and are detected at a client device. The client device can transmit the input audio signal to a data processing system, where the input audio signal can be parsed and passed to the data processing system of a service provider to fulfill the request in the input audio signal. Voice-activated systems can result in excessive data transmissions because one or more of the data processing systems may not be able to parse or understand the entities or terms in the input audio signals. For example, because of the conversational nature of the voice-activated system, users can often provide conversational-style answers that can be vague or unclear when removed from context. For example, when placing an order with a voice-driven (and hands free) digital assistant device, the data processing system of the service provider may receive an input audio signal from the digital assistant device that includes the statement "order a coffee from the coffee shop near my house." The service provider's data processing system may understand that the phrase "near my house" is a location entity; however, the service provider's data processing system may not be able to convert the phrase into a specific location or the address of a specific coffee shop. This can result in wasted computational resources as the service provider's data processing system transmits follow up requests to the digital assistant device to request clarifying or additional input audio signals.

Systems and methods of the present technical solution enable a reduction in reducing computing resource utilization, and network bandwidth by reducing the number of network transmissions required to complete voice-based requests. The present solution can enable the digital assistant to automatically convert unclear terms into terms that can be processed by the service provider's data processing system, which can reduce the number of follow up input audio signals required to complete a request. For example, the present solution can enable the digital assistant to convert the term "home" into a specific address prior to transmitting the term to the service provider's data processing system, such that "123 Main St." can be transmitted to the service provider's data processing system rather than the term "home."

The present solution can also increase the privacy of the end user. For example, the end user can approve of transmitting an address to the service provider, a third-party. However, the end user may not wish to allow the third-party to know that the provided location is the end user's home address. The present solution can enable the digital assistant to convert the term "home" (or other protected term) into formatted data (e.g., a specific address), which the third-party does not know is the user's home. The present solution can address problems associated with third-party service providers interacting with a user using a voice-based interface and can overcome technical challenges associated with allowing third-party service providers to operate together with a voice-based system.

FIG. 1 illustrates an example system 100 to generate voice-activated threads in a networked computer environment. The system 100 can include a data processing system 102. The data processing system 102 can communicate with one or more of a digital component provider device 106 (e.g., content provider device), client computing devices 104, or service provider devices 160 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, digital assistant, personal digital assistant, smartwatch, wearable device, smart phone, portable computer, or speaker. For example, via the network 105 a user of the client computing device 104 can access information, data, or services provided by digital component provider devices 106 or the service provider devices 160. The client computing device 104 may or may not include a display. For example, the client computing device 104 may include limited types of user interfaces, such as a microphone and speaker (e.g., the client computing device 104 can include a voice-drive or audio-based interface). The primary user interface of the computing device 104 can include a microphone and speaker.

The network 105 can include or constitute a display network, e.g., a subset of information resources available on the internet that are associated with a content placement or search engine results system, or that are eligible to include third party digital components. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the digital component provider device 106.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network, and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example, with the computing device 104, service provider device 160, or the digital component provider device 106. The data processing system 102 can include at least one computation resource, server, processor, or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm, or a machine farm. The servers can also be geographically dispersed. A data center or machine farm may be administered as a single entity, or the machine farm can include a plurality of machine farms. The servers within each machine farm can be heterogeneous: one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high-performance storage systems on localized high-performance networks. Centralization of all or some of the data processing system 102 components, including servers and storage systems, and coupling them with advanced system management tools, allows more efficient use of server resources, which saves power and processing requirements and reduces bandwidth usage.

The client computing device 104 can include, execute, interface, or otherwise communicate with one or more of at least one local digital assistant 134, at least one sensor 138, at least one transducer 140, at least one audio driver 142, or at least one display 144. The sensor 138 can include, for example, a camera, an ambient light sensor, proximity sensor, temperature sensor, accelerometer, gyroscope, motion detector, GPS sensor, location sensor, microphone, video, image detection, or touch sensor. The transducer 140 can include or be part of a speaker or a microphone. The audio driver 142 can provide a software interface to the hardware transducer 140. The audio driver 142 can execute the audio file or other instructions provided by the data processing system 102 to control the transducer 140 to generate a corresponding acoustic wave or sound wave. The display 144 can include one or more hardware or software component configured to provide a visual indication or optical output, such as a light emitting diode, organic light emitting diode, liquid crystal display, laser, or display.

The local digital assistant 134 can include or be executed by one or more processors, logic array, or memory. The local digital assistant 134 can detect a keyword and perform an action based on the keyword. The local digital assistance 134 can be an instance of the remote digital assistance component 112 executed at the data processing system 102 or can perform any of the functions of the remote digital assistance component 112. The local digital assistant 134 can filter out one or more terms or modify the terms prior to transmitting the terms as data to the data processing system 102 (e.g., remote digital assistant component 112) for further processing. The local digital assistant 134 can convert the analog audio signals detected by the transducer 140 into a digital audio signal and transmit one or more data packets carrying the digital audio signal to the data processing system 102 via the network 105. The local digital assistant 134 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local digital assistant 134 can perform pre-filtering or pre-processing on the input audio signal to remove certain frequencies of audio. The pre-filtering can include filters such as a low-pass filter, high-pass filter, or a bandpass filter. The filters can be applied in the frequency domain. The filters can be applied using digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The local digital assistant 134 on the computing device 104 can apply the bandpass filter prior to transmitting the input audio signal to the data processing system 102, thereby reducing network bandwidth utilization. However, based on the computing resources available to the computing device 104 and the available network bandwidth, it may be more efficient to provide the input audio signal to the data processing system 102 to allow the data processing system 102 to perform the filtering.

The local digital assistant 134 can apply additional pre-processing or pre-filtering techniques such as noise reduction techniques to reduce ambient noise levels that can interfere with the natural language processor. Noise reduction techniques can improve accuracy and speed of the natural language processor, thereby improving the performance of the data processing system 102 and manage rendering of a graphical user interface provided via the display 144.

The client computing device 104 can be associated with an end user that enters voice queries as audio input into the client computing device 104 (via the sensor 138 or transducer 140) and receives audio (or other) output from the data processing system 102 or digital component provider device 106 to present, display, or render to the end user of the client computing device 104. The digital component can include a computer-generated voice that can be provided from the data processing system 102 or digital component provider device 106 to the client computing device 104. The client computing device 104 can render the computer-generated voice to the end user via the transducer 140 (e.g., a speaker). The computer-generated voice can include recordings from a real person or computer-generated language. The client computing device 104 can provide visual output via a display device 144 communicatively coupled to the computing device 104.

The end user that enters the voice queries to the client computing device 104 can be associated with multiple client computing devices 104. For example, the end user can be associated with a first client computing device 104 that can be a speaker-based digital assistant device, a second client computing device 104 that can be a mobile device (e.g., a smartphone), and a third client computing device 104 that can be a desktop computer. The data processing system 102 can associate each of the client computing devices 104 through a common login, location, network, or other linking data. For example, the end user may log into each of the client computing devices 104 with the same account user name and password.

The client computing device 104 can receive an input audio signal detected by a sensor 138 (e.g., microphone) of the computing device 104. The input audio signal can include, for example, a query, question, command, instructions, or other statement provided in a spoken language. The input audio signal can include an identifier or name of a third-party (e.g., a digital component provider device 106) to which the question or request is directed. For example, the query can include the name of the subscription-based music service (an example digital component provider device 106) in the input audio signal in order to instruct the data processing system 102 to provide the request to the specified subscription-based music service. For example, the input audio signal can include "Play my music playlist on XYZ Music Service." The music service can provide the songs associated with the playlist to the client computing device 104 through the network 105 or to the data processing system 102, which can provide the songs associated with the playlist to the client computing device 104 through the network 105.

The client computing device 104 can include, execute, or be referred to as a digital assistant device. The digital assistant device can include one or more components of the computing device 104. The digital assistant device can include a graphics driver that can receive display output from the data processing system 102 and render the display output on display 132. The graphics driver can include hardware or software components that control or enhance how graphics or visual output is displayed on the display 144. The graphics driver can include, for example, a program that controls how the graphic components work with the rest of the computing device 104 (or digital assistant). The local digital assistant 134 can filter the input audio signal to create a filtered input audio signal, convert the filtered input audio signal to data packets, and transmit the data packets to a data processing system comprising one or more processors and memory.

The digital assistant device can include an audio driver 142 and a speaker component (e.g., transducer 140). The pre-processor component 140 can receive an indication of the display output and instruct the audio driver 142 to generate an output audio signal to cause the speaker component (e.g., transducer 140) to transmit an audio output corresponding to the indication of the display output.

The system 100 can include, access, or otherwise interact with at least digital component provider device 106. The digital component provider device 106 can include one or more servers that can provide digital components to the client computing device 104 or data processing system 102. The digital component provider device 106 or components thereof can be integrated with the data processing system 102 or executed at least partially by the data processing system 102. The digital component provider device 106 can include at least one logic device such as a computing device having a processor to communicate via the network 105, for example with the computing device 104, the data processing system 102, or the digital component provider device 106. The digital component provider device 106 can include at least one computation resource, server, processor, or memory. For example, the digital component provider device 106 can include a plurality of computation resources or servers located in at least one data center.

A digital component provider device 106 can provide audio, visual, or multimedia-based digital components for presentation by the client computing device 104 as an audio output digital component or visual output digital component. The digital component can be or include a digital content. The digital component can be or include a digital object. The digital component can include subscription-based content or pay-for content. A digital component can include a plurality of digital content items. For example, a digital component can be a data stream from a streaming music service (e.g., the digital component provider device 106). The streamed digital component can include multiple songs as different digital content items. The digital components can include or can be digital movies, websites, songs, applications (e.g., smartphone or other client device applications), or other text-based, audio-based, image-based, or video-based content.

The digital component provider device 106 can provide the digital components to the client computing device 104 via the network 105 and bypass the data processing system 102. The digital component provider device 106 can provide the digital component to the client computing device 104 via the network 105 and data processing system 102. For example, the digital component provider device 106 can provide the digital components to the data processing system 102, which can store the digital components and provide the digital components to the client computing device 104 when requested by the client computing device 104.

The data processing system 102 can include at least one computation resource or server. The data processing system 102 can include, interface, or otherwise communicate with at least one interface 110. The data processing system 102 can include, interface, or otherwise communicate with at least one remote digital assistant component 112. The remote digital assistant component 112 can include, interface, or otherwise communicate with at least one NLP component 114, at least one direct action handler component 135, and a least one remote application launcher 116. The data processing system 102 can include, interface, or otherwise communicate with at least one digital component selector 120. The data processing system 102 can include, interface, or otherwise communicate with at least one data repository 124. The at least one data repository 124 can include or store, in one or more data structures or databases, deep links 126, policies 128, templates 130, or content data 132. The data repository 124 can include one or more local or distributed databases, and can include a database management The components of the data processing system 102 can each include at least one processing unit or other logic device such as a programmable logic array engine or module configured to communicate with the database repository or database 124. The components of the data processing system 102 can be separate components, a single component, or part of multiple data processing systems 102. The system 100 and its components, such as a data processing system 102, can include hardware elements, such as one or more processors, logic devices, or circuits.

The data processing system 102 can include an interface 110. The interface 110 can be configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface ("API") that includes definitions for communicating between various components, such as software components.

The data processing system 102 can include an application, script, or program installed at the client computing device 104, such as a local digital assistant 134 to communicate input audio signals to the interface 110 of the data processing system 102 and to drive components of the client computing device to render output audio signals or visual output. The data processing system 102 can receive data packets, a digital file, or other signals that include or identify an input audio signal (or input audio signals). The computing device 104 can detect the audio signal via the transducer 140 and convert the analog audio signal to a digital file via an analog-to-digital converter. For example, the audio driver 142 can include an analog-to-digital converter component. The pre-processor component 140 can convert the audio signals to a digital file that can be transmitted via data packets over network 105.

The remote digital assistant component 112 of the data processing system 102 can execute or run an NLP component 114 to receive or obtain the data packets including the input audio signal detected by the sensor 138 of the computing device 104. The data packets can provide a digital file. The NLP component 114 can receive or obtain the digital file or data packets comprising the audio signal and parse the audio signal. For example, the NLP component 114 can provide for interactions between a human and a computer. The NLP component 114 can be configured with techniques for understanding natural language and enabling the data processing system 102 to derive meaning from human or natural language input. The NLP component 114 can include or be configured with techniques based on machine learning, such as statistical machine learning. The NLP component 114 can utilize decision trees, statistical models, or probabilistic models to parse the input audio signal. The NLP component 114 can perform, for example, functions such as named entity recognition (e.g., given a stream of text, determine which items in the text map to names, such as people or places, and what the type of each such name is, such as person, location (e.g., "home"), or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), or semantic processing (e.g., processing that can occur after identifying a word and encoding its meaning in order to relate the identified word to other words with similar meanings).

The NLP component 114 can convert the input audio signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 114 matches the text to words that are associated, for example via training across users or through manual specification, with actions that the data processing system 102 can serve. The NLP component 114 can convert image or video input to text or digital files. The NLP component 114 can process, analyze, or interpret image or video input to perform actions, generate requests, or select or identify data structures.

The data processing system 102 can receive image or video input signals, in addition to, or instead of, input audio signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, or machine learning techniques can be collectively referred to as imaging techniques. The data processing system 102 (e.g., the NLP component 114) can be configured with the imaging techniques, in addition to, or instead of, audio processing techniques.

The NLP component 114 can obtain the input audio signal. From the input audio signal, the NLP component 114 can identify at least one request, at least one trigger keyword corresponding to the request, and one or more entities. The request can indicate intent, digital components, or subject matter of the input audio signal. The trigger keyword can indicate a type of action likely to be taken. For example, the NLP component 114 can parse the input audio signal to identify at least one request to leave home for the evening to attend dinner and a movie. The trigger keyword can include at least one word, phrase, root or partial word, or derivative indicating an action to be taken. The intent can be an expressly stated intent that identifies an action to be taken or an agent to interact with. For example, the input audio signal that includes an express intent for a car service can be "Ok, get me a car service to the go to the movies." The intent can also be derived or not expressly stated. For example, in the input audio signal that includes "Ok, I want to go to the movies" does not expressly request a car service, but the NLP component 114 can derive the intent. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 114 can parse the input audio signal to identify, determine, retrieve, or otherwise obtain the request and the trigger keyword. For instance, the NLP component 114 can apply a semantic processing technique to the input audio signal to identify the trigger keyword or the request. The NLP component 114 can apply the semantic processing technique to the input audio signal to identify a trigger phrase that includes one or more trigger keywords, such as a first trigger keyword and a second trigger keyword. For example, the input audio signal can include the sentence "Play my favorite song." The NLP component 114 can determine that the input audio signal includes a trigger keyword "play." The NLP component 114 can determine that the request is for the end user's favorite song (a digital component). The NLP component 114 can identify an application identifier or a digital component provider device 106 identifier in the input audio signal. The application identifier or digital component provider device 106 identifier can indicate which application or digital component provider device 106 the end user would like to fill the request.

The data processing system 102 can execute or run an instance of the direct action handler component 135. The direct action handler component 135 can execute scripts or programs based on input received from the NLP component 114. The service provider device 160 can provide the scripts or programs. The service provider device 160 can make the scripts or programs available to the data processing system 102 through an API or webhooks. The direct action handler component 135 can determine parameters or responses to input fields and can package the data into an action data structure. The action data structure can be provided to the data processing system 102 through an API or webhooks. The direct action handler component 135 can transmit the action data structure to a service provider device 160 for fulfillment or the data processing system 102 can fulfill the action data structure.

The direct action handler component 135 can generate or select, based on the request or the trigger keyword identified in an input audio signal, data structures for the actions of a thread or conversation. Based on the request parsed by the NLP component 114, the direct action handler component 135 can determine to which of a plurality of service provider computing devices 160 the message should be sent. The direct action handler component 135 can determine that the input audio signal includes a request for an explicit service provider device 160 (e.g., "Order a car with Car Service XYZ," where the request specifically requests the request be fulfilled by Car Service XYZ) or can select from a plurality of service provider devices 160 can fulfill the request. The direct action handler component 135 can package the request into an action data structure for transmission as a message to a service provider computing device 160. The action data structure can include information for completing the request. The information can be data that the service provider device 160 uses to complete the request. Continuing the above example for a car service request, the information can include a pick up location and a destination location. The direct action handler component 135 can retrieve a template 130 from the repository 124 to determine which fields to include in the action data structure. The direct action handler component 135 can retrieve content from the repository 124 to obtain information for the fields of the data structure. The direct action handler component 135 can populate the fields from the template with that information to generate the data structure. The direct action handler component 135 can also populate the fields with data from the input audio signal or previous input audio signals. The templates 130 can be standardized for categories of service providers or can be standardized for specific service providers. For example, ride sharing service providers can use the following standardized template 149 to create the data structure: {client_deviceidentifier; authentication_credentials; pick_uplocation; destination_location; no_passengers; service_level}.

The direct action handler component 135 can be configured to expand responses or entities contained in the responses. The direct action handler component 135 can expand entities that the NLP component 114 identifies in the input audio signal. The direct action handler component 135 can expand the entities to convert the entities into a format that the service provider device 160 requires for a given field of its action data structures. The entities can include information that may be ambiguous or unclear to a service provider device 160. For example, when the service provider device 160 requested a street address, the end user may provide an entity that is the proper name of a location or business. The direct action handler component 135 can automatically generate the expanded entity based on content or preferences the data processing system 102 received from the client computing device 104. The direct action handler component 135 can generate the expanded entity based on content or preferences the data processing system 102 requests from the client computing device 104 in a subsequent audio-based input request. For example, the data processing system 102 can receive an input audio signal that includes "Ok, request a car service to pick me up at home." The NLP component 114 can identify the term "home" as an entity that the service provider device 160 cannot recognize. For example, the NLP component 114 can identify "home" as a location entity; however, the location field in the action data structure can require a street address, city, state, and zip code. In this example, the "home" location entity is not in the format requested by the service provider device 160. If the end user of the client computing device 104 previously provided the data processing system 102 with the end user's home address, the direct action handler component 135 can expand "home" into the format requested by field of the service provider device's action data structure (e.g., {street_address: "123 Main St.", city: "Anytown", state: "CA"}). If the end user did not previously provide the data processing system 102 with the end user's home address, the data processing system 102 can generate and transmit an audio-based input request that requests the end user indicate a specific address rather than "home." Expanding the entity prior to transmitting the entity to the service provider device 160 can reduce the number of required network transmission because the service provider device 160 may not need to request clarifying or additional information after receiving the unexpanded entity.

The direct action handler component 135 can expand the entities based on an expansion policy 128 that is associated with the client computing device 104 that provided the input audio signal. The expansion policy 128 can indicate whether the digital component provider device 128 has permission to expand or convert the identified entity. For example, and continuing the above example, the direct action handler component 135 can, based on the expansion policy 128, determine whether the direct action handler component 135 has access to convert the location entity "home" into a specific address.

The direct action handler component 135 can generating input requests based at least on the interface type of the client computing device 104 and one or more fields of an action data structure for a service provider device 160. The data processing system 102 can gather information and populate the fields of a service provider device's action data structure by transmitting a series of input requests to the client computing device 104. For example, the data processing system 102 can initiate a conversation-based data exchange with the client computing device 104. The content of the input request can be defined by the service provider device 160. For example, the service provider device 160 can define the dialog of the input requests that prompt the end user of the client computing device 104 to provide inputs to the data processing system 102 (via the client computing device 104) such that the direct action handler component 135 can populate the fields of the action data structure. The service provider device 160 may have to develop multiple instances of the dialogs to account for the different types of client computing devices 104 that may interact with the data processing system 102. The different types of client computing device 104 may include different types of interfaces, which can also be referred to as surfaces. For example, a first client computing device 104 can include a voice-only interface, and a second client computing device 104 can include a screen-based interface.

The direct action handler component 135 can enable the service provider device 160 to provide only the action data structure the service provider device 160 needs populated to fulfill a request. The direct action handler component 135, rather than the service provider device 160, can generate or define the input requests based on the fields in the action data structure. The direct action handler component 135 can generate or define the input requests based on the fields in the action data structure and a device type or interface type associate with the client computing device 104. The input requests can be data objects that can include text, images, audio, videos, or any combination thereof. When executed or rendered by the client computing device 104, the client computing device 104 generates output signals (via a screen, speaker, or other interface). For example, for a client computing device 104 that includes a touch screen, rendering the input request can cause the client computing device 104 to display input boxes a user can select via the touch screen. For a client computing device 104 that includes only a voice-based interface, rendering the input request can cause the client computing device 104 to present audio prompts to the user via the client computing device's speakers.

The direct action handler component 135 can populate one or more fields of the action data structure without generating an input request that is transmitted to the client computing device 104. The direct action handler component 135 can populate one or more fields of the action data structure with content previously provide by the client computing device 104 (or end user thereof). For example, if the action data structure requests an address that the end user previously provided either while setting up the client computing device 104 (or an account associated with the client computing device 104) or in a prior input audio signal.

The data processing system 102 can execute or run an instance of the remote application launcher 116. The remote application launcher 116 can identify, via the NLP component 114, keywords, tokens, terms, concepts, intents, or other information in the digital file or prior audio input to identify one or more applications stored on or executable by the client computing device 104 to fulfill the identified intent. The remote application launcher 116 can parse log files of application installs provided by the client computing device 104 to determine which applications are installed on the client computing device. For example, the NLP component 114 can determine that the intent for the input audio signal "Ok, request a car to take me to the airport" is to request a car service. When the client computing device 104 installs an application configured to fulfill one or more intents, the application can register with the data processing system 102. For example, the application can provide the data processing system 102 with a manifest file that indicates which intents the application can fulfill. The data processing system 102 can store an indication of the application and intent in the database in association with a unique identifier associated with the client computing device 104. Based on determining the intent of the request, the remote application launcher 116 can search the manifests stored in association with the unique identifier for the client computing device 104 and select an application that is configured to fulfill the intent.

The remote application launcher 116 can generate a deep link. The remote application launcher 116 can transmit the deep link to the client computing device 104. The deep link can cause the client computing device 104 to launch or invoke the application that the remote application launcher 116 selected to fulfill the intent. The data processing system 102 can store templates of the deep-links associated with the applications executed by the client computing device 104 as deep links 126 in the repository 124. The remote application launcher 116 can populate the deep links with entities identified in the input audio signal, expanded entities, or other content the client computing device 104 (or user thereof) previously provided the data processing system 102. Once launched, the application can populate one or more fields in the application with the information or data populated into the deep links. For example, continuing the above example, the remote application launcher 116 can populate the deep link with the end users home address and the airport address. Execution of the deep link by the application can, for example, cause the car service application to automatically populate the start location field with the end user's home address and the destination field with the address of the airport.

The data processing system 102 can execute or run an instance of the digital component selector 120. The digital component selector 120 can select a digital component that includes text, strings, characters, video files, image files, or audio files that can be processed by the client computing device 104 and presented to the user via the display 144 or the transducer 140 (e.g., speaker). Deep links can be an example digital component. Action data structures can be an example digital component.

The digital component selector 120 can select a digital component that is responsive to the request identified by the NLP component 114 in the input audio signal. The digital component selector 120 can select which digital component provider device 106 should or can fulfill the request and can forward the request to the digital component provider device 106. For example, the data processing system 102 can initiate a session between the digital component provider device 106 and the client computing device 104 to enable the digital component provider device 106 to transmit the digital component to the client computing device 104. The digital component selector 120 can request digital component from the digital component provider device 106. The digital component provider device 106 can provide digital components to the data processing system 102, which can store the digital components in the data repository 124. Responsive to a request for a digital component, the digital component selector 120 can retrieve the digital component from the data repository 124.

The digital component selector 120 can select multiple digital components via a real-time content selection process. The digital component selector 120 can score and rank the digital components and provide multiple digital components to the output merger component 120 to allow the output merger component 120 to select the highest ranking digital component. The digital component selector 120 can select one or more additional digital components that are transmitted to a second client computing device 104 based on an input audio signal (or keywords and requests contained therein). The one or more additional digital components can be transmitted to the second client computing device 104 as part of or in addition to the authorization request. For example, if the input audio signal from the first client computing device 104 includes a request for a digital component from a first digital component provider device 106, the digital component selector 120 can select one or more digital components that correspond to one or more related digital component provider devices 106. In one illustrative example, the input audio signal can include a request to start a streaming music to a first client computing device 104. The digital component selector 120 can select additional digital components (e.g., ads) that are associated with a different digital component provider device 106. The data processing system 102 can include the additional digital components in the authorization request to the second client computing device 104. The additional digital components can inform an end user of additional or related digital component provider devices 106 that could fulfill the request from the first client computing device 104.

The digital component selector 120 can provide the digital component selected in response to the request identified in the input audio signal to the computing device 104, or local digital assistant 134, or application executing on the computing device 104 for presentation. Thus, the digital component selector 120 can receive the content request from the client computing device 104, select, responsive to the content request, a digital component, and transmit, to the client computing device 104, the digital component for presentation. The digital component selector 120 can transmit, to the local digital assistant 134, the selected digital component for presentation by the local digital assistant 134 itself or a third-party application executed by the client computing device 104. For example, the local digital assistant 134 can play or output an audio signal corresponding to the selected digital component.

The data repository 124 can store deep links 126 that can be stored in one or more data structures or data files. The deep links 126 can be stored in a table or database. The deep links 126 can include links, pointers, references, or other address or location information of an application that can be executed by the client computing device 104. A deep link to an application can refer to a uniform resource locator or hyperlink that links to a specific resource, web content, application, or view within an application. The deep link can include the information used to point to a particular resource or application, launch an application, or populate predetermined fields within the application. Deep links can include uniform resource identifiers ("URI") that links to a specific location within a mobile application in addition to launching the application. For example, opening, selecting, or executing a deep link on the client computing device 104 can cause the client computing device 104 to open an application associated with the digital component provider device 106. The deep link fully or partially pre-populates a registration or sign-up form within the opened application. In this example, to register for the subscription service offered by the digital component provider device 106, the end user may need to only review the information entered into the form and then select a confirmation icon located on the loaded application page. The deep links 126 data structure can include a hash table that maps application names or views of an application to a deep link.

The data repository 124 can store expansion policies 128 that can be stored in one or more data structures or data files. The expansion policies 128 can indicate what data, information, or entities can be expanded. The data processing system 102 can store a different expansion policy 128 for each of the client computing devices 104 associated with the data processing system 102.

The data repository 124 store content data 132 that can include, for example, digital components provided by a digital component provider device 106 or obtained or determined by the data processing system 102 to facilitate content selection. The content data 132 can include, for example, digital components (or digital component object) that can include, for example, a content item, an online document, audio, images, video, multimedia content, or third-party content. The content data 132 can include digital components, data, or information provided by the client computing devices 104 (or end user thereof). For example, the content data 132 can include user preferences, user information stored by the user, or data from prior input audio signals.

The service provider device 160 can execute, include, or access a service provider NLP component 161 and a service provide interface 162. The service provider NLP component 161 can be an instance of or perform the functions of the NLP component 114. For example, the data processing system 102 can forward an input audio signal to the service provider device 160 and the service provider NLP component 161 can process the input audio signal. The service provider interface 162 can be an instance of the interface 110. The service provider interface 162 can be software interface or a hardware interface. The service provider interface 162 can be an API or set of webhooks.

Figure 2:
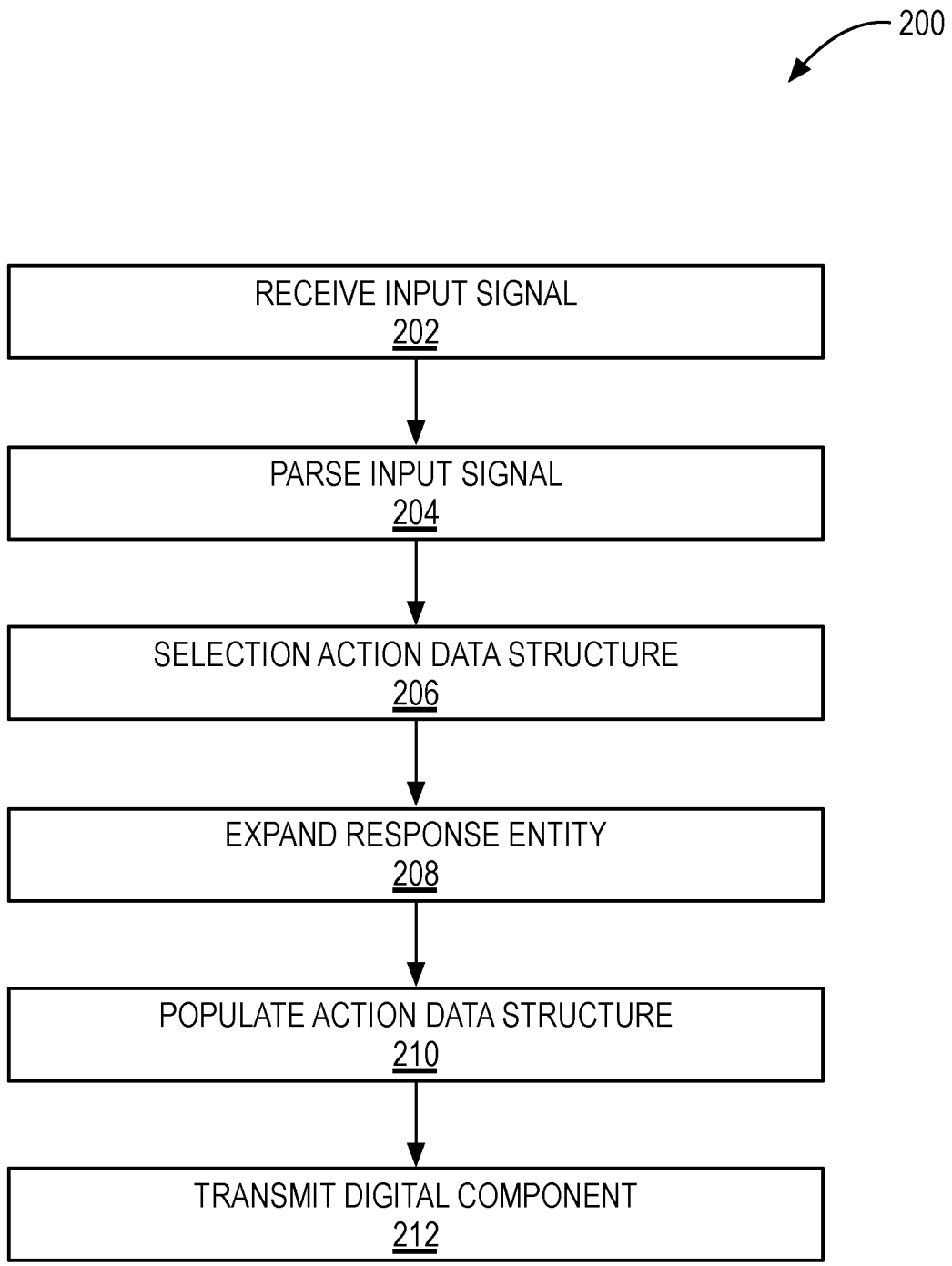
FIG. 2 illustrates a block diagram of an example method to generate voice-activated threads in the system illustrated in FIG. 1, in accordance with an example of the present disclosure.

FIG. 2 illustrates a block diagram of an example method 200 to generate voice-activated threads in a networked computer environment. The method can include receiving an input audio signal (ACT 202). The method 200 can include parsing the input audio signal (ACT 204). The method 200 can include selecting an action data structure (ACT 206). The method 200 can include expanding a response entity (ACT 208). The method can include populating the action data structure (ACT 210). The method 200 can include transmitting the digital component (ACT 212).

The method 200 can include can include receiving an input signal (ACT 202). The method can include receiving, by an NLP component executed by a data processing system, the input signal. The input signal can be an input audio signal that is detected by a sensor at a first client device and transmitted to the data processing system. The sensor can be a microphone of the first client device. For example, a digital assistant component executed at least partially by a data processing system that includes one or more processors and memory can receive the input audio signal. The input audio signal can include a conversation facilitated by a digital assistant. The conversation can include one or more inputs and outputs. The conversation can be audio based, text based, or a combination of audio and text. The input audio signal can include text input, or other types of input that can provide conversational information. The data processing system can receive the audio input for a session corresponding to the conversation.

The method 200 can include parsing the input signal (ACT 204). The NLP component of the data processing system can parse the input signal to identify a request. The NLP component can identify at least one entity in the input signal. The request can be an intent or request that can be fulfilled by one or more service provider devices. The request can be a part of a conversational phrase. For example, the request can be "Ok, order a car to take me home." The entities identified by the NLP component can be phrases or terms in the request that map to input fields or types the service provider device requests when fulfilling a request. For example, the service provider device providing the car service may request a current location input field and a destination input field. Continuing the above example, the NLP component can map the term "home" to the destination input field.

The method 200 can include selecting an action data structure (ACT 206). The data processing system can select the action data structure based on the request parsed from the input signal. The data processing system can select the action data structure based on the service provider device that can fulfill the request. The action data structure can be a data structure or object that is created by the service provider device. The service provider device can provide the action data structure to the data processing system. The action data structure can indicate fields, data, or information that the service provider device uses to fulfill requests. The service provider device can flag one or more of the fields to request that the data processing system expand the entity returned for that field. When a field is flagged for expansion, the data processing system can design and generate conversation-based data exchanges with the client computing device 104 to retrieve information or data for the flagged field rather than the service provider device 160 designing the conversation-based data exchange.

The method 200 can include expanding the response entity (ACT 208). The data processing system can determine the entity mapped to the input field needs to be expanded if the entity is not in a format specified by the service provider device. Continuing the above example, the NLP component can determine "home" is the entity mapped to a destination. The direct action handler component can determine to update the action data structure to include the entity "home" in a destination field. The direct action handler component can determine the format of the response entity does not match the format of the destination field. For example, the destination field can have the format of an object that requests a street address, city, state, and zip code. Detecting a mismatch between the format of the response entity and the format of the field, the data processing system can expand the entity to a street address, city, state, and zip code format. For example, the data processing system can look up the address the end user provided the data processing system as the end user's "home" address. The data processing system can check that the format of the response entity does not match the format of the destination field and rather than forwarding the response to the service provider device, the data processing system can expand the entity. The data processing system can automatically expand the entity because the data processing system knows that the response provided by the user is not in the correct format and the response could cause the agent of the service provider device to fail. For example, the service provider device may not be able to understand the entity "home." If the data processing system determines the entity is not in the correct format and the data processing system cannot expand the entity into the proper format, the data processing system can transmit an input request to the client computing device that can prompt the user of the client computing device for additional information. The data processing system can expand the entity based on an expansion policy. The expansion policy can indicate whether the data processing system has permission to expand the term or can indicate what end user or client computing device provided data can be included in an expanded entity.

The data processing system can expand the entity based on a request from a service provider device. For example, the data processing system can generate a first action data structure with the unexpanded entity. The data processing system can transmit the first action data structure to the service provider device for processing to fulfill the request. The service provider device can return the action data structure (or a portion thereof) to the data processing system if the service provider device cannot process or understand the data in on or more of the action data structure's fields. For example, the service provider device can attempt to process the "home" entity in the destination field and then request the data processing system expand the "home" entity after the service provider device determines that it cannot process or understand the entity.

The method 200 can include populating the action data structure (ACT 210). The direct action handler component can populate the action data structure with the expanded entity. The direct action handler component can populate the action data structure with the entity. For example, the action data structure can be an object into which the entity or expanded entity is stored. Populating the action data structure can also be referred to update the action data structure.

The method 200 can include transmitting the action data structure (ACT 212). The data processing system can transmit the populated action data structure to the service provider device. Upon receipt of the action data structure, the service provider device can fulfill the request or request additional information from the data processing system or client computing device.

Figure 3:
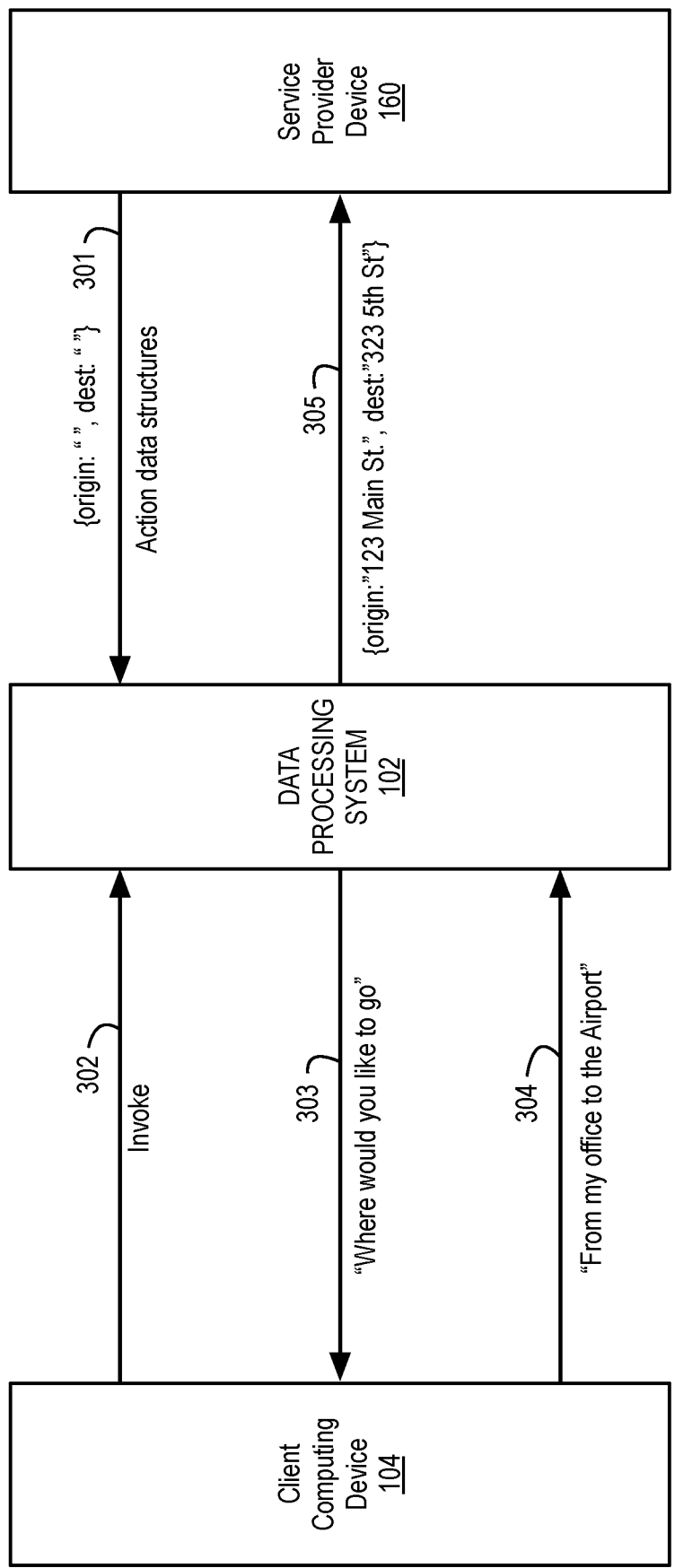
FIG. 3 illustrates a block diagram of example data flows between components of the system illustrated in FIG. 1, in accordance with an example of the present disclosure.

FIG. 3 illustrates a block diagram of an example data flows between components of the system 100 illustrated in FIG. 1. FIG. 3 illustrates the data flows during an example implementation of the method 200 illustrated in FIG. 3. The example includes the expansion of an entity identified in an input signal. The example can include transmitting one or more data flows between the data processing system 102, client computing device 104, and the service provider device 160.

At a first time point, the service provider device 160 can transmit a first data flow 301 to the data processing system 102. The first data flow 301 can include an action data structure template. The action data structure template can indicate to the data processing system 102 what fields the service provider device 160 may require to fulfill one or more intents or services. For example, the first data flow 301 can include an action data structure template for requesting a car service. In the example illustrated in FIG. 3, the action data structure template includes {origin: " ", dest: " "}, which indicates that the service provider device 160 may need an origin location and a destination location when a car service is requested.

The client computing device 104 can transmit a data flow 302 to the data processing system 102 to invoke a service provided by the service provider device 160. The data flow 302 can include an input audio signal. The input audio signal can, in the example illustrated in FIG. 3, include the phrase "Ok, order a car service." Based on the invocation of the data flow 302, the data processing system 102 can transmit an input request, such as an audio-based input request, to the client computing device 104 in data flow 303. Rendering or presentation of the input request illustrated in FIG. 3 at the client computing device 104 can cause the client computing device 104 to present through a speaker at the client computing device 104 "Where would you like to go?" The end user can respond to the input request. For example, the end user can speak "from my office to the airport" in response to the input request. The client computing device 104 can via the sensor 138 (e.g., a microphone) detect the end user's response, digitize the response, and transmit the response to the data processing system 102 as an input audio signal within the data flow 304.

The data processing system 102 can parse the input audio signal and identify one or more response entities in the input audio signal. The data processing system 102 can identify response entities that are vague. The response entities can be terms or phrases that the NLP component 114 maps to one or more fields of the action data structure. For example, as illustrated in FIG. 3, the action data structure includes two fields that each require locations as inputs. The data processing system 102 can map the term "office" and "airport" as response entities that map to the formats associated with the fields of the action data structure. Based on an expansion policy associated with the client computing device 104, the data processing system 102 can expand the response entities into a format required by the fields of the action data structure. In the example illustrated in FIG. 3, the "office" response entity is expanded to "123 Main St." and the term "airport" is expanded to "323 5th St." The action data structure with the expanded response entities can be transmitted to the service provider device 160 in the data flow 305.

Figure 4:
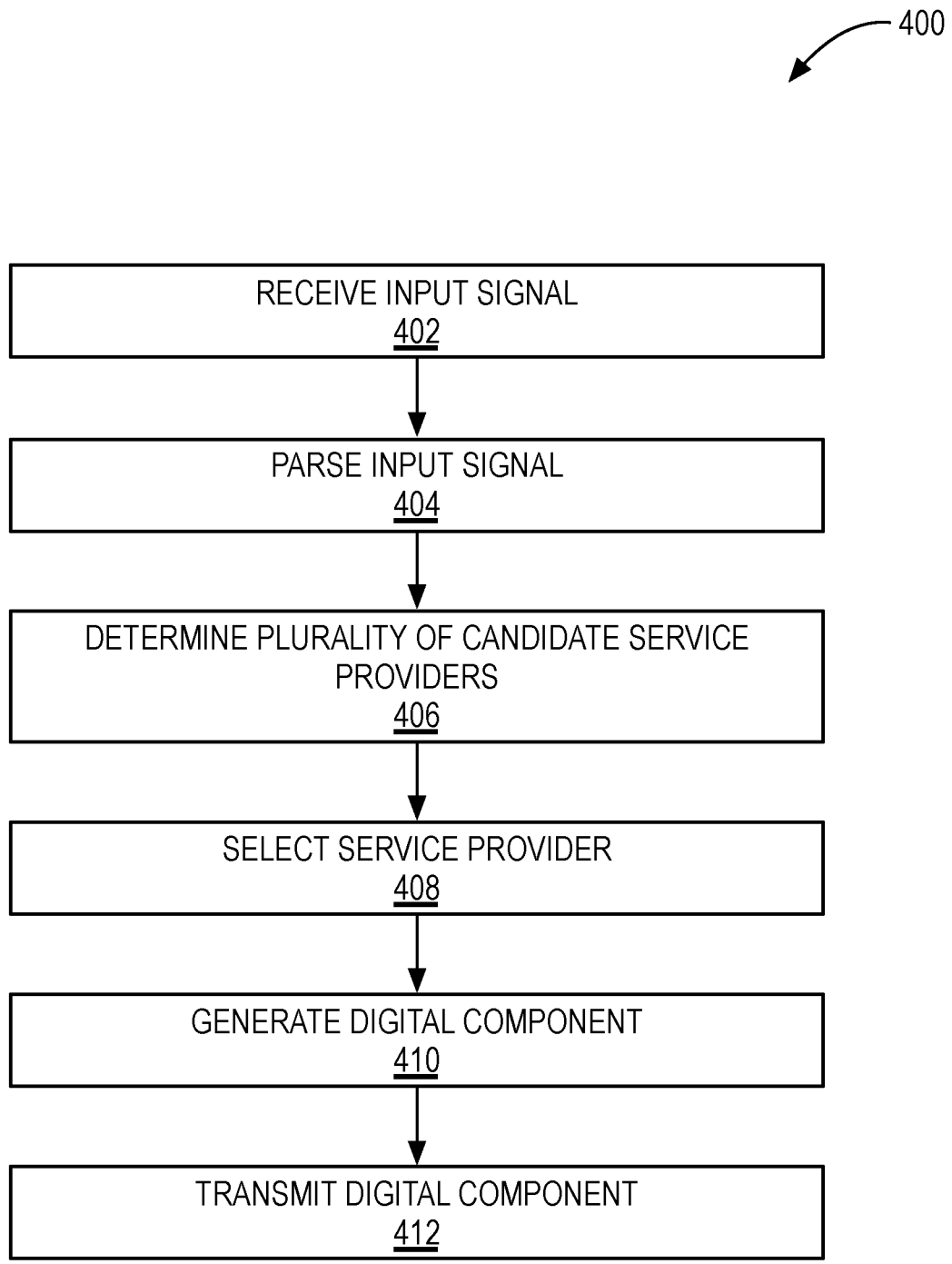
FIG. 4 illustrates a block diagram of an example method to generate voice-activated threads in the system illustrated in FIG. 1, in accordance with an example of the present disclosure.

FIG. 4 illustrates a block diagram of an example method 400 to generate voice-activated threads in a networked computer environment. The method can include receiving an input audio signal (ACT 402). The method 400 can include parsing the input audio signal (ACT 404). The method 400 can include determining a plurality of candidate service provider devices (ACT 406). The method 400 can include selecting a service provider device (ACT 408). The method 400 can include generating a digital component (ACT 410). The method 400 can include transmitting the digital component (ACT 412).

As set forth above, and also referring to FIG. 1, among others, the method 400 can include can include receiving an input signal (ACT 402). The method can include receiving, by an NLP component executed by a data processing system, the input signal. The input signal can be an input audio signal that is detected by a sensor at a first client device and transmitted to the data processing system. The sensor can be a microphone of the first client device. For example, a digital assistant component executed at least partially by a data processing system that includes one or more processors and memory can receive the input audio signal. The input audio signal can include a conversation facilitated by a digital assistant. The conversation can include one or more inputs and outputs. The conversation can be audio based, text based, or a combination of audio and text. The input audio signal can include text input or other types of input that can provide conversational information. The data processing system can receive the audio input for a session corresponding to the conversation.

The method 400 can include parsing the input signal (ACT 404). The NLP component of the data processing system can parse the input signal to identify a request and at least one entity. The request can be an intent or request that can be fulfilled by one or more service provider devices. The request can be a conversational phrase. For example, the request can be "Ok, order a car to take me home." The entities identified by the NLP component can be phrases or terms in the request that map to input fields or types the service provider device requests when fulfilling a request. For example, the service provider device providing the car service may request a current location input field and a destination input field. Continuing the above example, the NLP component can map the term "home" to the destination input field.

The method 400 can include determining or identifying a plurality of candidate service provider devices (ACT 406). Each of the plurality of candidate service provider devices can be configured to fulfill the request identified in the input audio signal. Each of the candidate service provider devices can be associated with a respective application that is installed on the client computing device. For example, each of the candidate service provider devices can be car service providers that provide applications that an end user can install on their client computing device (e.g., smart phone) to request a car from the car service provider. The data processing system can maintain a database that indicates which applications are installed on the client computing device. For example, the applications can be installed through an application store provided by the data processing system and the data processing system can update an entry in the data repository when applications are installed or removed from the client computing device. Determining or identifying which service provider device can fulfill the request can include identifying a data processing system that can include a plurality of devices, identifying a webhook address of the service provider device, an IP address of the service provider device, a domain name of the service provider device, or an API of the service provider device.

If the data processing system determines that the no application associated with one of the candidate service provider devices is installed on the client computing device, the data processing system can select a service provider device from the candidate service provider devices and generate an action data structure rather than a digital component (e.g., deep link). The data processing system can populate the action data structure with entities or expanded entities identified in the input signal. The data processing system can transmit the action data structure to the selected service provider device to fulfill the request.

The method 400 can include selecting a service provider device (ACT 408). The data processing system can select the service provider device from the plurality of service provider devices. The data processing system can select the service provider device based on a network latency between the data processing system and each of the candidate service provider devices. For example, if the latency between a specific service provider device and the data processing system is high, the data processing system can determine that the candidate service provider device is experiencing network or other computational problems and that new request should not be transmitted to the specific candidate service provider device. The data processing system can select the service provider device from the candidate service provider devices based on a selection made by an end user of the client computing device. For example, the data processing system can transmit an input request to the client computing device that when rendered by the client computing device presents a list of the candidate service provider devices. The end user can provide a selection to the data processing system through an input audio signal transmitted from the client computing device. The data processing system can select the service provider device based on a performance of the candidate service provider devices. The performance can be a computational performance or a service rating. For example, the service rating can be generated by user reviews after interacting with the specific service provider device. The data processing system can select the service provider device based on which candidate service provider device has the highest service rating.

The method 400 can include generating a digital component (ACT 410). The method 400 can include generating, by the action handler component, a digital component that can include an indication of the application associated with the service provider device. The digital component can also include the first entity. The digital component, when executed or rendered by the client computing device, can cause the client computing device to launch the application associated with the service provider device. The digital component can be a deep link. The digital component can be an action data structure. The application can be used to fulfill the request in the input audio signal. For example, and continuing the above example, when executed, the digital component can launch the car requesting application on the end user's smart phone. The digital component can include one or more fields. The direct action handler component can populate the entity or an expanded version of the entity into one or more fields of the digital component.

The method 400 can include transmitting the digital component to the first client computing device (ACT 412). The data processing system can transmit the digital component to the client computing device in response to receiving the input audio signal. When the client computing device receives the digital component (e.g., a deep link), the digital component can be rendered on a screen of the client computing device. The end user can activate the client computing device by selecting the deep link. Activation of the deep link can cause the client computing device to open the application associated with the selected service provider device. The deep link can also populate fields (e.g., text fields) of the open application with the entities populated into the digital component.

Figure 5:
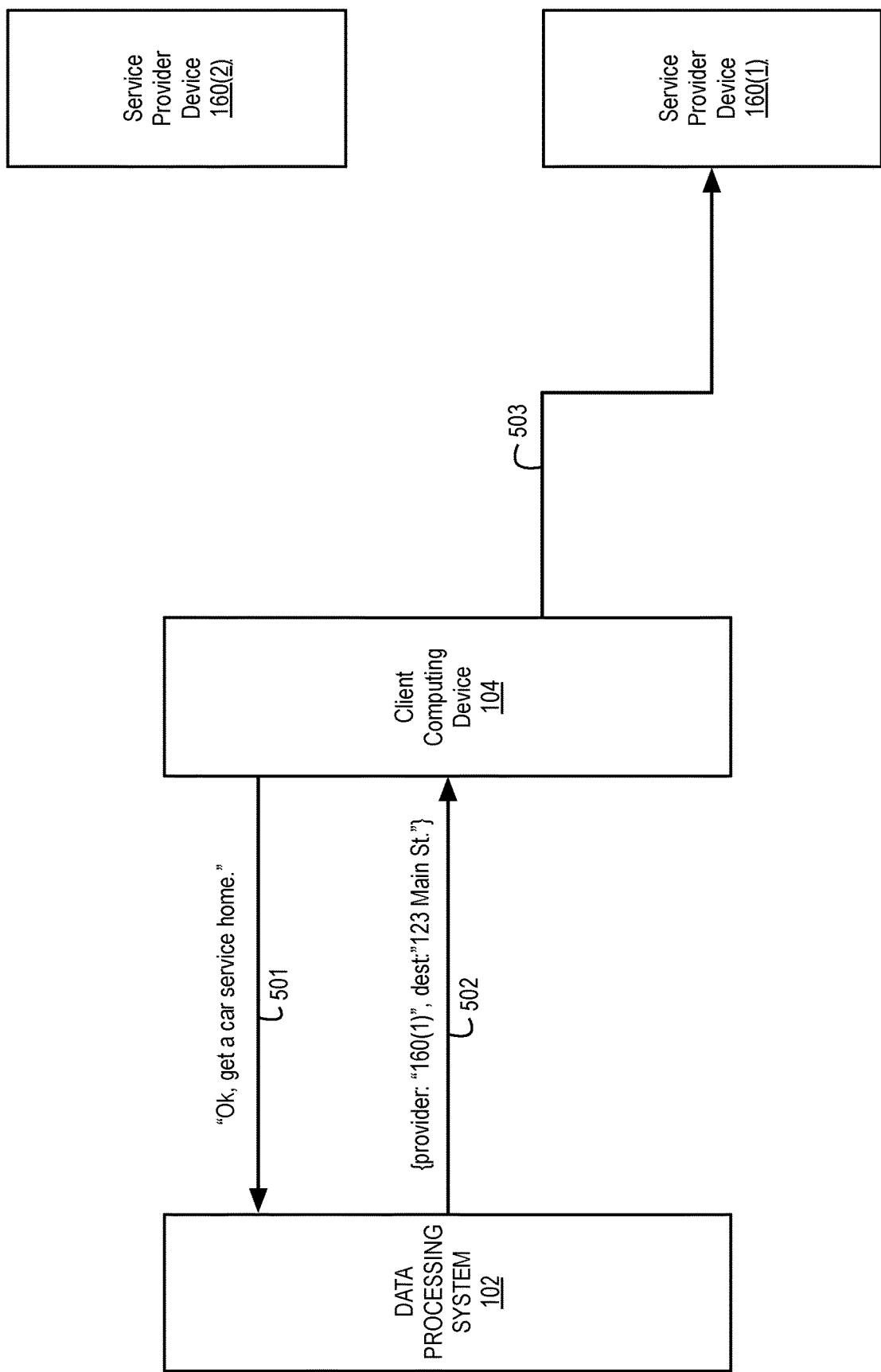
FIG. 5 illustrates a block diagram of example data flows between components of the system illustrated in FIG. 1, in accordance with an example of the present disclosure.

FIG. 5 illustrates a block diagram of example data flows between components of the system 100 in illustrated in FIG. 1. FIG. 5 illustrates the data flows during an example implementation of the method 400 illustrated in FIG. 4. The example includes the expansion of an entity identified in an input signal and the fulfillment of an intent with deep links. The data flows can be between a client computing device 104, a data processing system 102, a first service provider device 160(1), and a second service provider device 160(2).

As illustrated in FIG. 5, and also referring to FIG. 1 among others, the client computing device 104 can transmit a first input audio signal to the data processing system 102 in a first data flow 501. In the example illustrated in FIG. 5, the input audio signal includes the phrase "Ok, get me a car service home." The data processing system 102 receive the data flow and determine that the input audio signal includes a request or intent for a car service. The data processing system 102 can access a log file that indicates which applications are installed on the client computing device 104. The log file can also indicate which intents or request types each of the applications can fulfill. For example, the client computing device 104 can include a first application that is associated with the service provider device 160(1), which can be a first car service provider and a second application that is associated with the service provider device 160(2), which can be a second car service provider. The data processing system 102 can select one of the service provider device 160(1) and the service provider device 160(2) to fulfill the request in the input audio signal.

The data processing system 102 can select a deep link template that is associated with the selected service provider device 160 from the deep links 126 stored in the data repository 124. For example, in the example illustrated in FIG. 5, the data processing system 102 can select the service provider device 160(1). The data processing system 102 can generate the deep link and populate the fields of the deep link with entities or expanded entities the NLP component 114 identified in the input audio signal. For example, the entity "home" in the input audio signal can be expanded to "123 Main St." The data processing system 102 can transmit the deep link to the client computing device 104 in data flow 502. When the client computing device 104 renders or executes the deep link, the deep link can cause the client computing device 104 to open or execute the application identified in the deep link. For example, the deep link transmitted to the client computing device 104 in the data flow 502 can cause the client computing device 104 to open the application associated with the service provider device 160(1).

Execution of the deep link can also cause the data from the fields of the deep link to be automatically populated into one or more fields of the open application. For example, when the client computing device 104 opens the application associated with the service provider device 160(1), the deep link can cause "123 Main St." to be populated into the destination field of the application. The client computing device 104, via the application associated with the service provider device 160(1), can send a data flow 503 to the service provider device 160(1) to fulfill the request in the input audio signal of the data flow 501.

The data processing system can generate voice-activated threads in a networked computer environment. The data processing system can receive a first input audio signal that is detected by a sensor of a first client computing device. The data processing system can parse the first input audio signal to identify a first request. The data processing system can select a first action data structure based on the first request. The first action data structure can be associated with a first service provider device. The data processing system can transmit a first audio-based input request to the first client based at least on a field in the first action data structure. The data processing system can receive a second input audio signal detected by the sensor of the first client computing device that is generated in response to the first audio-based input request. The data processing system can parse the second input audio signal to identify a response entity in the second input audio signal. The data processing system can expand the response entity based on an expansion policy that is associated with the first client computing device. Expanding the response entity can include converting the response entity into format associated with the field in the first action data structure. The data processing system can populate the expanded response entity into the field of the first action data structure. The data processing system can transmit the first action data structure to the first service provide to fulfill the first request.

Figure 6:
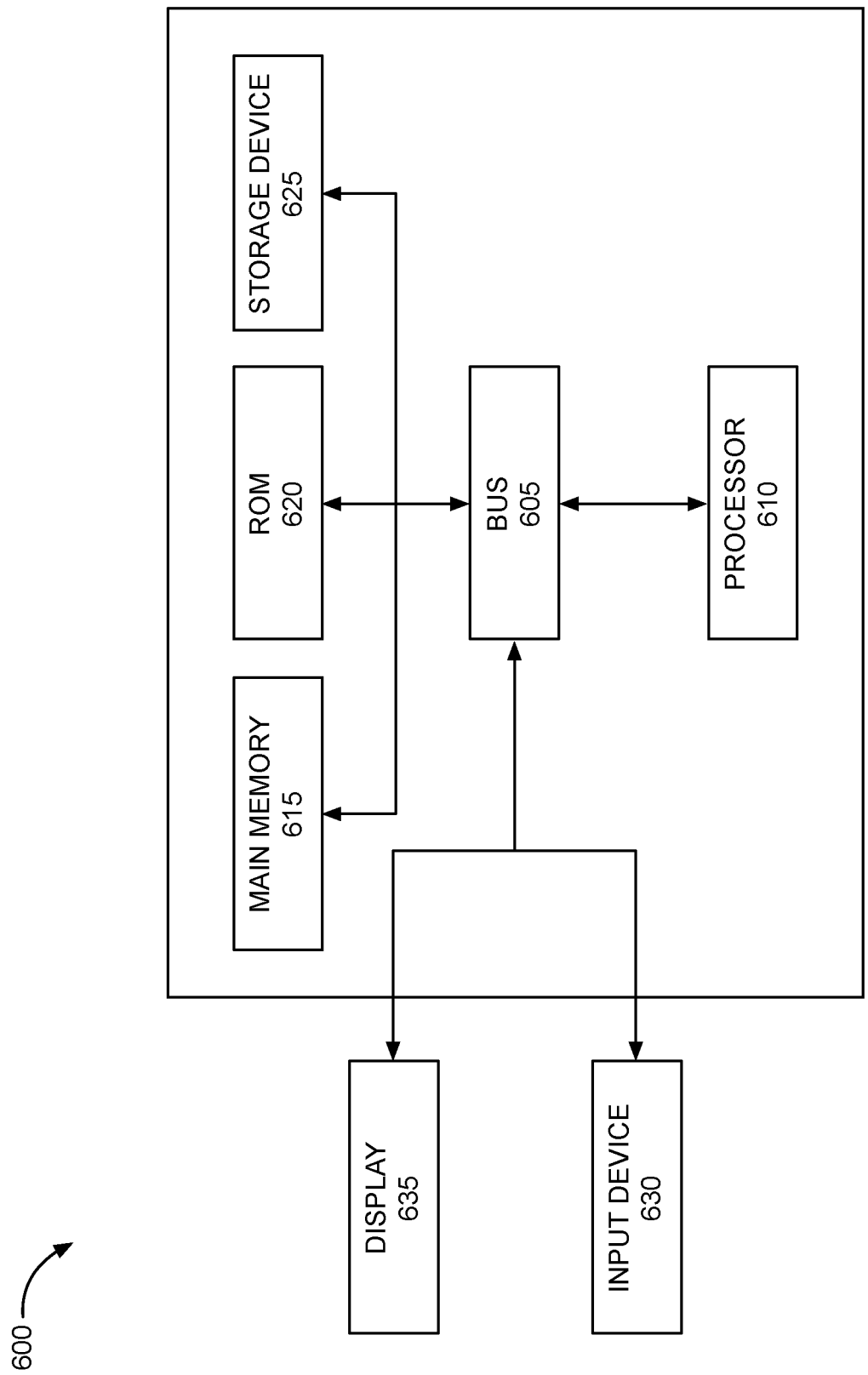
FIG. 6 is a block diagram of an example computer system that can be used in the system illustrated in FIG. 1, in accordance with an example of the present disclosure.

FIG. 6 is a block diagram of an example computer system 600. The computer system or computing device 600 can include or be used to implement the system 100, or its components such as the data processing system 102. The data processing system 102 can include an intelligent personal assistant or voice-based digital assistant. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information, and instructions to be executed by the processor 610. The main memory 615 can be or include the data repository 124. The main memory 615 can also be used for storing position information, temporary variables, or other intermediate information during execution of instructions by the processor 610. The computing system 600 may further include a read-only memory (ROM) 620 or other static storage device coupled to the bus 605 for storing static information and instructions for the processor 610. A storage device 625, such as a solid-state device, magnetic disk or optical disk, can be coupled to the bus 605 to persistently store information and instructions. The storage device 625 can include or be part of the data repository 124.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 102, the client computing device 104 or other component of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the interface 110, digital component selector 120, the direct action handler component 135, remote launcher application 116, or NLP component 114 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component (e.g., an application server), or that includes a front end component (e.g., a client computer having a graphical user interface or a web browser through which a user can interact with an implementation of the subject matter described in this specification), or a combination of one or more such back end, middleware, or front end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 600 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 104 or the digital component provider device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 114, direct action handler component 135, remote launcher application 116, or the digital component selector 120, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. For example, the computing device 104 can generate the packaged data object and forward it to the third-party application when launching the application. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system to generate voice-activated threads in a networked computer environment, comprising:
   a natural language processor component executed by a data processing system to:
   receive first input audio signal detected by a sensor of a first client computing device;
   parse the first input audio signal to identify a first request;
   parse the first input audio signal to identify a response entity in the first input audio signal;
   a digital component selector executed by the data processing system to select a digital component provided by a digital component provider device based on the first request, and transmit the digital component to the first client computing device, wherein the digital component comprises an indication of an application associated with a service provider device and the response entity;
   an action handler component executed by the data processing system to select a first action data structure based on the first request, the first action data structure associated with a first service provider device;
   the action handler component to:
   convert the response entity based on an expansion policy associated with the first client computing device and into a format associated with a field in the first action data structure;
   store the response entity in the format associated with the field in the first action data structure; and
   an interface of the data processing system to transmit the first action data structure to the first service provider device to fulfill the first request.

2. The system of claim 1, comprising:
the digital component selector to transmit the digital component to a local digital assistant executing on the first client computing device.

3. The system of claim 1, comprising:
the digital component selector to transmit the digital component to a third-party application executed by the first client computing device.

4. The system of claim 1, comprising:
the digital component selector to select the digital component via a real-time content selection process that comprises determines a score and a rank for each of a plurality of digital components to cause selection of a highest scoring and ranking digital component of the plurality of digital components.

5. The system of claim 1, comprising:
the digital component selector to select the digital component configured to fulfill the first request, wherein the digital component is different from the first action data structure.

6. The system of claim 1, comprising:
the digital component selector to select the digital component associated with a second service provider device different from the first service provider device, wherein the digital component is configured to fulfill the first request.

7. The system of claim 1, comprising:
the action handler component to transmit a first audio-based input request to the first client computing device based at least on a second field in the first action data structure;
the natural language processor component to receive a second input audio signal detected by the sensor of the first client computing device and generated in response to the first audio-based input request;
the natural language processor component to parse the second input audio signal to identify a second response entity in the second input audio signal; and
the action handler component to populate the second field in the first action data structure with the second response entity.

8. The system of claim 1, comprising:
the natural language processor component to receive a second input audio signal detected by the sensor of the first client computing device;
the natural language processor component to parse the second input audio signal to identify a second request;
the action handler component to select a second action data structure based on the second request, the second action data structure associated with the first service provider device;
the natural language processor component to parse, the second input audio signal to identify a second response entity in the second input audio signal; and
the action handler component to determine not to expand the second response entity based on the expansion policy associated with the first client computing device.

9. The system of claim 1, comprising:
the natural language processor component to map the response entity to the field in the first action data structure.

10. The system of claim 1, comprising:
the action handler component to determine that the response entity comprises a second format not associated with the format associated with the field in the first action data structure; and
the action handler component to expand the response entity based on the response entity having the second format not associated with the format associated with the field in the first action data structure.

11. A method of generating voice-activated threads in a networked computer environment, comprising:
receiving, by a data processing system, first input audio signal detected by a sensor of a first client computing device;
parsing, by the data processing system, the first input audio signal to identify a first request;
parsing, by the data processing system, the first input audio signal to identify a response entity in the first input audio signal;
selecting, by the data processing system, a digital component provided by a digital component provider device based on the first request, wherein the digital component comprises an indication of an application associated with a service provider device and the response entity;
transmitting, by the data processing system, the digital component to the first client computing device;
selecting, by the data processing system, a first action data structure based on the first request, the first action data structure associated with a first service provider device;
converting, by the data processing system, the response entity based on an expansion policy associated with the first client computing device and into a format associated with a field in the first action data structure;
storing, by the data processing system, the response entity in the format associated with the field in the first action data structure; and
transmitting, by the data processing system, the first action data structure to the first service provider device to fulfill the first request.

12. The method of claim 11, comprising:
transmitting, by the data processing system, the digital component to a local digital assistant executing on the first client computing device.

13. The method of claim 11, comprising:
transmitting, by the data processing system, the digital component to a third-party application executed by the first client computing device.

14. The method of claim 11, comprising:
selecting, by the data processing system, the digital component via a real-time content selection process that comprises determines a score and a rank for each of a plurality of digital components to cause selection of a highest scoring and ranking digital component of the plurality of digital components.

15. The method of claim 11, comprising:
selecting, by the data processing system, the digital component configured to fulfill the first request, wherein the digital component is different from the first action data structure.

16. The method of claim 11, comprising:
selecting, by the data processing system, the digital component associated with a second service provider device different from the first service provider device, wherein the digital component is configured to fulfill the first request.

17. The method of claim 11, comprising:
transmitting, by the data processing system, a first audio-based input request to the first client computing device based at least on a second field in the first action data structure;

receiving, by the data processing system, a second input audio signal detected by the sensor of the first client computing device and generated in response to the first audio-based input request;

parsing, by the data processing system, the second input audio signal to identify a second response entity in the second input audio signal; and populating, by the data processing system, the second field in the first action data structure with the second response entity.

18. The method of claim 11, comprising:

receiving, by the data processing system, a second input audio signal detected by the sensor of the first client computing device;

parsing, by the data processing system, the second input audio signal to identify a second request;

selecting, by the data processing system, a second action data structure based on the second request, the second action data structure associated with the first service provider device;

parsing, by the data processing system, the second input audio signal to identify a second response entity in the second input audio signal; and determining, by the data processing system, not to expand the second response entity based on the expansion policy associated with the first client computing device.

19. The method of claim 11, comprising:

mapping, by the data processing system, the response entity to the field in the first action data structure.

20. The method of claim 11, comprising:

determining, by the data processing system, that the response entity comprises a second format not associated with the format associated with the field in the first action data structure; and expanding, by the data processing system, the response entity based on the response entity having the second format not associated with the format associated with the field in the first action data structure.

* * * * *